Figure 1:
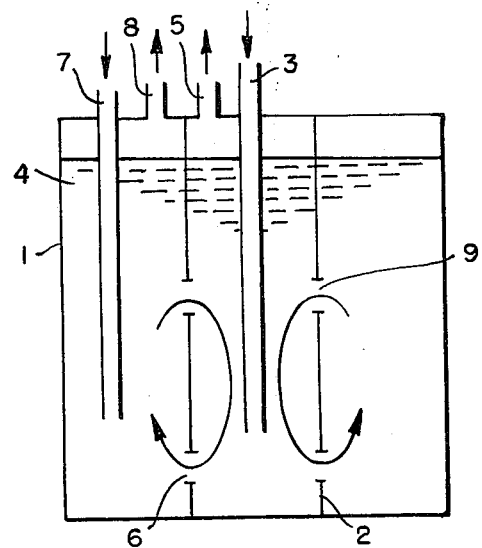

United States Patent [19]
de Beuckelaer et al.

[11] 3,969,490
[45] July 13, 1976

[54] PRODUCTION OF HYDROGEN CHLORIDE BY THERMAL DISSOCIATION OF ORGANIC SUBSTANCES CONTAINING CHLORINE

[75] Inventors: Gerard de Beuckelaer, Hoevenen, Belgium; Gerd Krome, Ludwigshafen, Germany; Jan Langens, Kapellen, Belgium; Ferdinand Lockefeer, Berchem, Belgium; Paul Schaerlaekens, Ekren, Belgium

[73] Assignee: BASF Aktiengesellschaft, Ludwigshafen (Rhine), Germany

[22] Filed: Dec. 12, 1973

[21] Appl. No.: 423,924

[30] Foreign Application Priority Data
Dec. 16, 1972 Germany........................ 2261795

[52] U.S. Cl................................ 423/481; 423/488; 423/659
[51] Int. Cl.²......................... C01B 7/08; C01B 7/01
[58] Field of Search................... 423/481, 488, 659

[56] References Cited
UNITED STATES PATENTS

| | | | |
|---|---|---|---|
| 3,220,798 | 11/1965 | Cull et al. | 423/488 X |
| 3,589,864 | 6/1971 | Ezaki | 423/488 |
| 3,716,339 | 2/1973 | Shigaki et al. | 423/488 X |
| 3,829,558 | 8/1974 | Banks et al. | 423/481 |

FOREIGN PATENTS OR APPLICATIONS

| | | | |
|---|---|---|---|
| 47-32509 | 8/1972 | Japan | 423/488 |

OTHER PUBLICATIONS

Ser. No. 292,742; July, 1943, Beck et al.
Ser. No. 393,258; July, 1943, Beck et al.

*Primary Examiner*—Edward Stern
*Attorney, Agent, or Firm*—Johnston, Keil, Thompson & Shurtleff

[57] ABSTRACT

A process for the thermal dissociation of an organic substance containing chlorine in which substantially anhydrous hydrogen chloride is obtained. The substance containing chlorine is introduced in a first stage into a salt melt in the absence of oxygen, hydrogen chloride is discharged from the reaction mixture and then oxygen is supplied to the salt melt in a second stage.

4 Claims, 2 Drawing Figures

U.S. Patent   July 13, 1976   3,969,490

PRODUCTION OF HYDROGEN CHLORIDE BY THERMAL DISSOCIATION OF ORGANIC SUBSTANCES CONTAINING CHLORINE

The invention relates to a process for the thermal dissociation of organic substances containing chlorine in which substantially anhydrous chloride is obtained.

In the combustion of organic substances containing chlorine the substances formed include hydrogen chloride as well as carbon dioxide, carbon monoxide and water. To avoid environmental pollution, combustion of organic residues containing chlorine such as may occur for example in a plant for the manufacture of vinyl chloride has hitherto usually been avoided because separation of the hydrogen chloride formed from the water is expensive and uneconomical. Residues containing chlorine are therefore often deposited on dumps and to avoid contamination of the surface and ground water it is necessary to take expensive precautions. There is therefore a demand for the provision of combustion methods for organic residues containing chlorine which will permit economical exploitation of the hydrogen chloride formed in the combustion.

The invention has for its object to prepare hydrogen chloride which is substantially devoid of water, carbon dioxide and carbon monoxide by thermal dissociation of organic substances containing chlorine.

We have found that this object is achieved by a process in which in a first stage the organic substance containing chlorine is introduced into a salt melt in the absence of oxygen, the hydrogen chloride formed is discharged from the reaction mixture and in a second stage oxygen is supplied to the melt.

According to an advantageous embodiment of the invention the salt melt is returned to the first stage after the combustion products have been discharged so that it is easily possible to carry out the process of the invention continuously.

Hydrogen chloride may be prepared by the process from substances containing chlorine, for example from chemical compounds or mixtures of compounds containing chlorine such as mixtures of compounds which remain as distillation residues in the production of organic compounds containing chlorine. The compounds or mixtures should advantageously contain at least 30% by weight of chlorine. It is most convenient to use substances having a chlorine content of from 40 to 80% by weight. The organic compounds containing chlorine may be gaseous, liquid or solid at standard temperature and pressure. The process has proved to be particularly suitable for the production of hydrogen chloride from chlorine-containing plastics waste or off-spec material and distillation residues in the manufacture of vinyl chloride.

The melts used are those of salts or mixtures of salts which do not react with hydrogen chloride under the dissociation conditions. For example chlorides are particularly suitable and among these the chlorides of the alkali metals and especially potassium chloride. It is advantageous to use salts which under the reaction conditions undergo little or no decomposition and little or no reaction with oxygen. The salts or mixtures of salts conveniently have a melting point which is at least about 50°C and preferably at least 100°C lower than the reaction temperature. It is advantageous that the vapor pressure of the salt melt should be low at the reaction temperature so that loss of salt by evaporation is avoided or kept to a minimum. It is expedient to use salts or mixtures of salts whose vapor pressure at the reaction temperature is not more than 20 mm.

The process is conveniently carried out within a range of temperature in which at least 90% of the hydrogen chloride is eliminated from the organic compounds in less than 1 minute. The reaction temperatures or dissociation temperatures in the pyrolysis zone are thus conveniently from 400° to 1200°C and advantageously from 600° to 900°C.

Elimination of hydrogen chloride should take place in the absence of oxygen so as to avoid combustion of the carbonaceous and hydrogen-containing constituents of the chlorine-containing substance in the first stage.

The eliminated hydrogen chloride may be discharged from the reaction mixture of the first stage at superatmospheric, subatmospheric and advantageously at atmospheric pressure. With suitable choice of the salt mixture the hydrogen chloride under the reaction conditions is substantially devoid of water and carbon dioxide or salt constituents so that the hydrogen chloride may be used direct for chemical reactions or for the production of hydrochloric acid. It is also possible however for the gaseous hydrogen chloride to contain small amounts of soot, methane and traces of low-boiling chlorinated hydrocarbons.

In a second stage oxygen is supplied to the melt for the combustion of organic constituents remaining in it (mainly soot or coke). Gas containing oxygen, for example air, may be used instead of oxygen. The amount of oxygen should be such that the organic dissociation residues are completely burnt. It is expedient to use a slight excess of oxygen which should be from 10 to 20 mole% based on the carbon content.

The temperature in the second zone (combustion zone) may vary within wide limits. It depends on the rate of the reaction of the organic radicals with oxygen and is conveniently kept within a range from 650° to 1250°C. In the continuous embodiment of the process the temperature is kept higher in the second stage because heat is developed in the second stage and absorbed in the first stage.

Sometimes it is necessary to introduce an organic fuel, for example natural gas or fuel oil, either together with the oxygen or separately. The use of a submerged flame has proved to be particularly suitable.

The combustion products, mainly carbon dioxide, are removed from the reaction zone, most conveniently by evaporating or gassing off the combustion products at atmospheric pressure. It is advantageous to burn the dissociation residue completely before the salt melt is returned into the first stage. Continuous dissociation and combustion processes may be carried out in this way. In such a continuous operation the melt from the first stage is transferred from the first reaction zone to the second reaction zone where combustion of the residues is carried out in the second stage. This may be carried out for example in two reactors arranged concentrically as in an apparatus as shown in FIG. 1. The outer wall 1 of a reactor has a concentric ceramic wall 2 arranged therein concentrically. Organic substance containing chlorine is introduced through line 3 into a salt melt 4. Anhydrous hydrogen chloride escapes through opening 5. The melt in which dissociated product is contained passes through opening 6 into the reactor bounded by wall 2. Oxygen or air is introduced through opening 7. Combustion products escape through opening 8 and the melt passes through opening 9 into the space formed by walls 1 and 2.

It is also possible however to use a loop reactor or other apparatus for continuous operation of a two-stage process. It is important that provision should be made to ensure that hydrogen chloride formed in the first stage cannot pass into the reaction mixture in the second stage. This may be done for example by convenient design of the openings.

The following Examples will illustrate the invention. The parts and percentages specified in the Examples are by weight.

EXAMPLE 1

Figure 2:
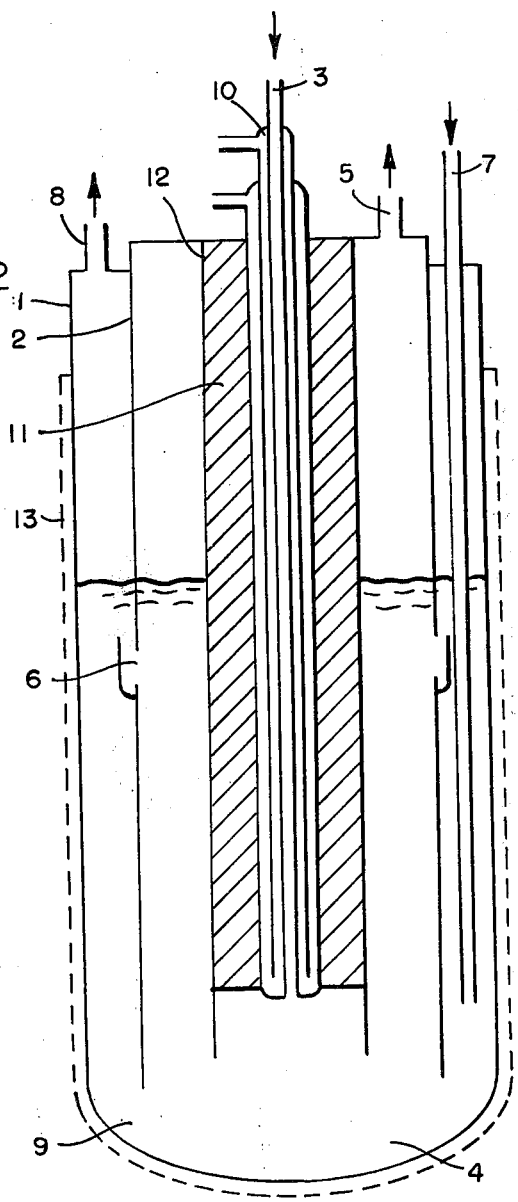

A residue from the distillation of vinyl chloride having a solids content of 50% (not distillable with steam) and containing 60% by weight of chlorine and also carbon and hydrogen is processed in apparatus as shown in FIG. 2. The outer wall 1 of the apparatus consists of ceramic material and a ceramic tube is placed therein to form a partition 2. The partition 2 separates the zone in which hydrogen chloride is eliminated (pyrolysis zone) from the combustion zone. Residue from the distillation of vinyl chloride is introduced continuously at the rate of 250 ml per hour through line 3. Line 3 is provided with cooling means 10 which is surrounded by insulation 11. The boundary with the chamber formed by partition 2 is formed by a wall 12. The apparatus contains about 9 kg of a potassium chloride melt 4 which is kept at a temperature of 800°C by electrical heating 13. The apparatus is filled with melt to the extent of about two-thirds of its height. Line 3 projects into the melt almost to the bottom of the apparatus. Gaseous hydrogen chloride escapes through opening 5. About 1.5% by weight of soot (based on the weight of hydrogen chloride) is separated by means of a cyclone from the hydrogen chloride. After the hydrogen chloride has been absorbed in water there remains about 5% by volume of gas based on the total volume of eliminated gas containing hydrogen chloride. The residual gas contains about 0.5% by volume of unsaturated hydrocarbons, 1% by volume of carbon dioxide, 18% by volume of methane and 80.5% by volume of hydrogen. The residual gas does not contain any free chlorine. Only traces of acetylene can be detected by gas chromatography. The dissociation products devoid of chlorine are dispersed in the melt which overflows through opening 6 into the interspace between partition 2 and wall 1. Air is blown in through opening 7. The melt in this region also has a temperature of 800°C. Gaseous combustion products consisting mainly of carbon dioxide and only traces of HCl escape from opening 8. The melt passes through opening 9 into the space bounded by partition 2. The amount of air entering through opening 7 is controlled so that circulation of the melt through openings 6 and 9 results by means of the gas lift. Mixing of the gas streams leaving through openings 5 and 8 can be avoided in this way.

EXAMPLE 2

Potassium chloride is introduced into a closed cylindrical vessel and kept at a temperature of 800°C in the melt. A watercooled probe similar to that shown in FIG. 2 and which is thermally insulated is introduced through the upper cover of the vessel into the melt. Residue from the distillation of vinyl chloride and which has a chlorine content of 65% and a solids content of 30% by weight (not capable of being distilled in steam) is first introduced into the melt. Gas and vapor escaping from the melt is passed through an opening in the cover and into water for the absorption of the hydrogen chloride formed. After the elimination of hydrogen chloride is completed, air is passed through the same opening. The residue containing carbon is thus burnt. The combustion products escape through another opening in the cover into the atmosphere. They consist mainly of carbon dioxide and only traces of hydrogen chloride are contained therein. The residue may be completely burnt so that the potassium chloride melt is free from impurities.

It is then possible again to introduce residues containing chlorine and to separate them in this way into hydrogen chloride and a combustion gas containing carbon dioxide.

EXAMPLE 3

The residues containing chlorine specified in the Table are thermally dissociated by a method as described in Example 1. The composition of the salt melts and the temperature prevailing in the pyrolysis zone and combustion zone as well as the composition of the gas stream containing hydrogen chloride are given in the Table.

The following abbreviations are used in the Table:

A = a mixture of waste PVC with residues from the vinyl chloride plant (about 50% by weight of Cl).

B = a mixture of distillation residues obtained in the production of vinyl chloride and propylene oxide (about 40% of chlorine).

%w/w = % by weight  %v/v = % by volume

Table

| Example | 3(a) | 3(b) | 3(c) | 3(d) |
|---|---|---|---|---|
| Substance containing chlorine | A | A | B | B |
| Type of salt melt | KCl | 50%w/w KCl 50%w/w NaCl | NaCl | 50%w/w KCl 50%w/w NaCl |
| Temperature in first stage: pyrolysis zone | 820°C | 730°C | 835°C | 755°C |
| Composition of HCl gas: | | | | |
| HCl | 94.2%v/v | 93.7%v/v | 92.7%v/v | 92.5%v/v |
| $H_2$ | 3.7%v/v | 3.4%v/v | 4.1%v/v | 3.7%v/v |
| $CH_4$ | 0.9%v/v | 1.2%v/v | 0.6%v/v | 0.7%v/v |
| $H_2O$ | 0.6%v/v | 0.7%v/v | 1.9%v/v | 1.8%v/v |
| other hydrocarbons and nitrogen | 0.6%v/v | 1%v/v | 0.7%v/v | 1.3%v/v |
| $C_2H_2$ | <1000 ppm | <1000 ppm | — | — |

We claim:

1. A process for the production of hydrogen chloride by thermal dissociation of an organic substance containing chlorine, wherein in a first stage, in which a temperature of from 400° to 1200°C. prevails, the substance containing chlorine is introduced into a salt melt of one or more alkali metal chlorides in the absence of oxygen, hydrogen chloride is discharged from reaction mixture and in a second stage, in which a temperature of from 650° to 1250°C. prevails, oxygen is supplied to the melt for the combustion of organic constituents remaining in it, and the combustion products are removed.

2. A process as set forth in claim 1 wherein a temperature of from 600° to 900°C is maintained in the first stage.

3. A process as set forth in claim 1 wherein the organic substance containing chlorine has a chlorine content of from 40 to 80% by weight.

4. A process as set forth in claim 1, said process being carried out on a continuous basis, wherein after the discharge of combustion products from the second stage, the salt melt is returned to the first stage.

* * * * *